May 7, 1968

A. FUDERER 3,382,040

PREPARATION OF ALUMINA WITH PRETREATMENT
OF SODIUM ALUMINATE LIQUOR WITH
ALCOHOL VAPORS

Filed Aug. 18, 1965

INVENTOR.
Andrija Fuderer

BY Michael J. Striker

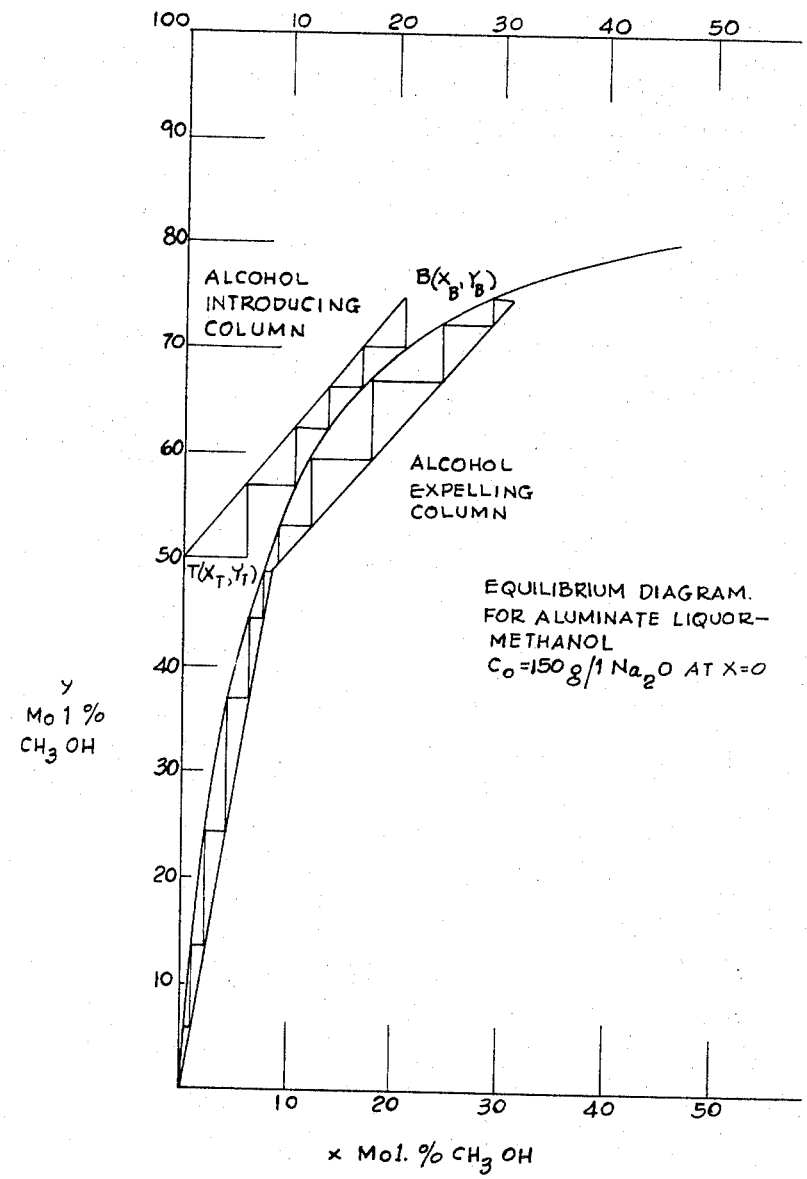

United States Patent Office 3,382,040
Patented May 7, 1968

3,382,040
PREPARATION OF ALUMINA WITH PRETREATMENT OF SODIUM ALUMINATE LIQUOR WITH ALCOHOL VAPORS
Andrija Fuderer, G. Prekrizje 32,
Zagreb I, Yugoslavia
Filed Aug. 18, 1965, Ser. No. 480,562
Claims priority, application Germany, Sept. 7, 1964,
F 43,925
8 Claims. (Cl. 23—143)

ABSTRACT OF THE DISCLOSURE

In the production of alumina, aluminum hydrate is separated from aluminate liquor by contacting the aluminate liquor with a mixture of water vapors and vapors of methanol and/or ethanol so as to achieve simultaneously dissolution of the alcohol in the aluminate liquor and evaporation of a portion of the water content thereof, seeding the thus-formed alcohol-containing aluminate liquor with aluminum hydrate crystals thereby causing precipitation of aluminum hydrate from the aluminate liquor, and separating solid aluminum hydrate from the thus-obtained reaction mixture.

---

Alumina is predominantly produced by working up bauxite in accordance with the well known Bayer method. A mixture of ground bauxite and aluminate liquor is heated in an autoclave, generally to above 200° C., thereby the aluminum oxide of the bauxite is dissolved in the liquor. After release of the over-pressure, cooling to about 100° C. and diluting, the so-called red mud is separated from the liquor and thereafter the liquor is cooled to between about 45 and 60° C. Aluminum hydrate will precipitate from the thus diluted and cooled liquor. The desired end product, namely alumina or aluminum oxide ($Al_2O_3$), is then obtained by heating the hydrate in rotary furnaces. The residual liquor is concentrated in evaporating devices and reintroduced into the process for decomposition of additional bauxite.

It is a disadvantage of this method that the so-called precipitating stirring of the liquor which will facilitate precipitation of the hydrate, results only in an incomplete precipitation of the aluminum hydrate and, furthermore, is a very prolonged process. Generally, the precipitating stirring and the precipitation of the hydrate will take between 60 and 100 hours and, nevertheless, only about 50 percent of the aluminum oxide content of the liquor will be precipitated. The time required for precipitation of the hydrate can be greatly shortened by adding methanol to the liquor. Thus, by mixing a suitable amount of methanol into the liquor, 80% of the aluminum oxide content of the aluminate liquor will be precipitated within ten hours. This results not only in greater economy with respect to investment in precipitators, i.e., vessels equipped with stirring devices and used for precipitating of hydrate from the aluminate liquor, but also other apparatus involved in the process can be of smaller size, since the amount of recirculating liquor is greatly reduced. However, although particularly the speeding up of the precipitation of the hydrate, by adding methanol to the liquor constitutes a very significant advantage, the above described method did not meet with practical success. The reason for the failure of this process is found in the very high energy requirements for the subsequent expelling of the methanol from the liquor, after precipitation of hydrate therefrom, i.e., the heat required for rectification of the methanol.

It has then been tried to improve the above described process by utilizing a two step or multistep distillation and by carrying out the distillation of the methanol under conditions of thermocompression, i.e., by compressing the vapors to a higher pressure, thus increasing the saturation or condensation temperature thereof, and subsequently using the compressed vapors to heat the same liquid from which the vapors have been liberated. For instance, by thermocompressing the vapors which leave an evaporator, the liquid in the evaporator may be indirectly heated with the compressed vapors. The same principle applies to the operation of a column. However, the energy or heat requirements are still very high and the practical development of the process met with difficulties.

A similar effect to that achieved by adding methanol to the liquor can also be obtained by adding ethanol. In other words, the time required for precipitation of the aluminum hydrate will be reduced by the incorporation in the aluminate liquor of either ethanol or methanol. However, the same difficulties which were experienced in connection with the introduction of methanol are also found when methanol is replaced by ethanol.

It is therefore an object of the present invention to provide a simple and economical process for the recovery of aluminum hydrate from aluminate liquor.

It is a further object of the present invention to provide a method which will facilitate the precipitation of aluminum hydrate from aluminate liquor.

It is yet another object of the present invention to facilitate the precipitation of aluminum hydrate from aluminate liquor by introduction of a lower alcohol, in such a manner that the heat or energy requirements of the process are greatly reduced.

Other objects and advantages of the present invention will become apparent from a further reading of the description and of the appended claims.

With the above and other objects in view, the present invention contemplates in a method of producing alumina, the steps of contacting aluminate liquor with a mixture of water vapors and vapors of an alcohol selected from the group consisting of methanol and ethanol so as to dissolve the alcohol in the aluminate liquor and simultaneously evaporating a portion of the water content thereof, and separating solid aluminum hydrate from the thus formed alcohol-containing aluminate liquor.

The addition of liquid alcohol to the alcohol free liquor is thermodynamically a definitely irreversible process connected with a considerable entropy increase and, thus, with loss of energy. Consequently, the method could not be improved by improving the conventional rectification process, but by introducing the alcohol into the aluminate liquor in a different manner. Thus, the general and broadest characteristic of the method of the present invention is the addition of alcohol to the aluminate liquor in the thermodynamically reversible manner.

According to the present invention, the aluminate liquor is intimately contacted with a vapor mixture which contains water vapors and vapors of a lower alcohol, particularly methanol and/or ethanol. Only a portion of the required amount of alcohol is introduced in this manner, while the balance of the required amount of alcohol is added in liquid form.

Preferably, at least 20% and at most 90% of the total amount of alcohol required, and most preferably between 40 and 80% thereof, are introduced into the aluminate liquor in the form of alcohol vapors while the residual portion of the alcohol is added in liquid form.

During contact of the aluminate liquor with the mixture of water and alcohol vapors, the liquor will take up alcohol from the vapor mixture and a portion of the water of the liquor will be vaporized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is an equilibrium diagram for the system: aluminate liquor-methanol.

Figure 1:
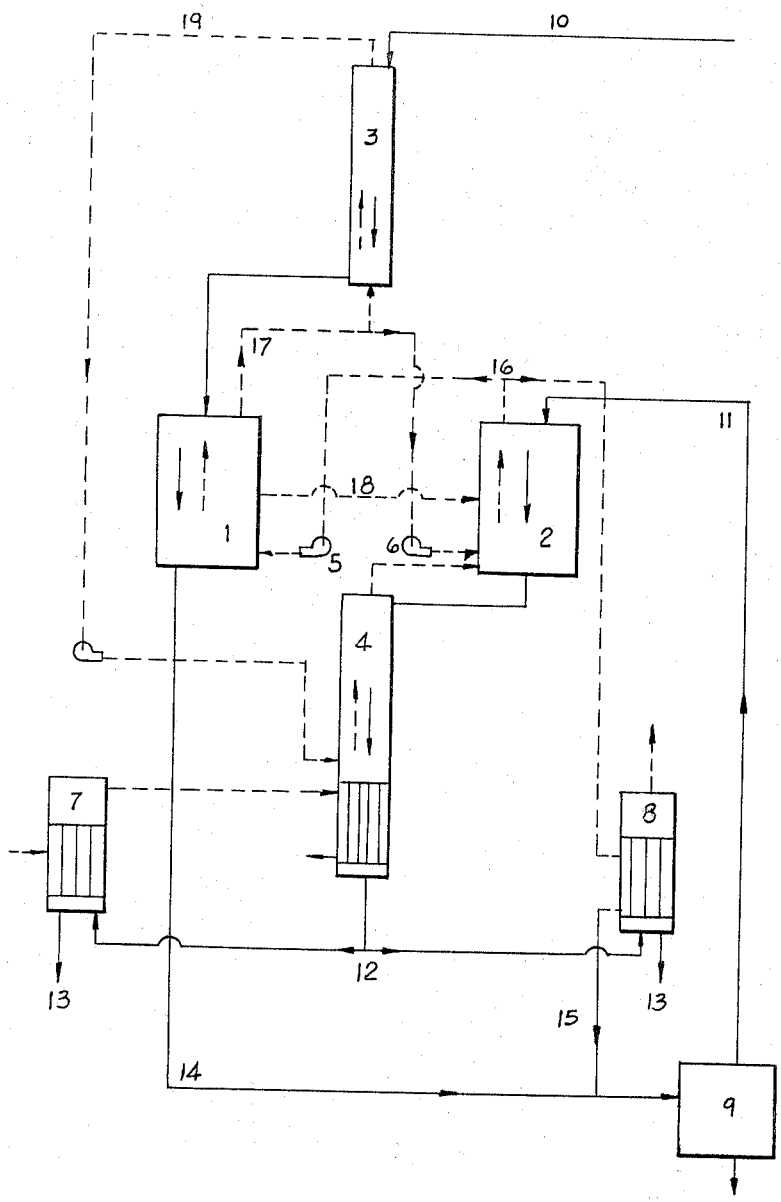
FIGURE 1 is a flow diagram of the process of the present invention.

Wherever methanol is mentioned herein, this is done by way of example only, and the methanol could be replaced by ethanol.

After, in conventional manner, separating the red mud from the aluminate liquor, the liquor is passed through a column in which it is contacted with a mixture of water and methanol vapors, whereby the liquor will be enriched with methanol. The column in which this process takes place will be described herein as an alcohol introducing column. The process which takes place in the alcohol introducing column differs from conventional absorption processes, inasmuch as the aqueous aluminate liquor simultaneously with taking up methanol will give off water vapors so that the molar quantity of the vapor mixture in the column will remain substantially stable or may even increase. The process according to which the lower boiling component in the liquid is enriched, simultaneously with enriching the higher boiling component in the vapor phase, is exactly the opposite of what is achieved in conventional rectification processes. The process according to the present invention is possible due to the fact that in the vapor phase the partial pressure of the water is lower and the partial pressure of the methanol is higher than the corresponding pressures in the liquid phase. In other words, the vapor mixture which contacts the aluminate liquor contains always more methanol and less water than would correspond to an equilibrium condition with the liquid phase.

In this connection, reference is made to FIG. 2 of the present drawing illustrating the equilibrium diagram and the theoretical number of plates (or equilibrium stages) of the alcohol introducing column as determined by the well known method of McCabe and Thiele. The line indicating the operating conditions of the alcohol introducing column will be found on the left side of the equilibrium curve, and the line indicating the operating conditions of the alcohol expelling column (which will be discussed in more detail further below) will be found on the right side of the equilibrium curve.

When the vapors leaving the top of the mixing or alcohol introducing column (at T) are introduced into the alcohol expelling column, the line indicating the operating conditions of the alcohol expelling column suddenly changes its slope at the corresponding point.

Thus, the present process requires two columns, namely an alcohol introducing column and an alcohol expelling column. The vapors which leave the alcohol introducing column contain between 30 and 100 mol percent water vapors and are passed into the lower portion of the alcohol expelling column. On the other hand, the vapors leaving the alcohol expelling column will contain, preferably, only between 15 and 25 mol percent water vapors and are introduced into the lower portion of the alcohol introducing column.

It is particularly advantageous to withdraw vapor mixture at one or more points along the length of the alcohol introducing column and to introduce the thus withdrawn vapors at the corresponding portions of the alcohol expelling column. It is achieved thereby that a lesser quantity of vapors will flow through the upper portion of the alcohol introducing column and through the lower portion of the alcohol expelling column so that it becomes possible to reduce the operative cross sectional area of these portions of these two columns as compared with the operative cross sectional areas of the lower portion of the alcohol introducing column and the upper portion of the alcohol expelling column.

The process, according to the present invention, will now be further described with reference to FIG. 1 of the drawing which represents a flow diagram of the process in which reference numerals 1–9 refer to structural elements of the device in which the process is carried out, reference numerals 10–15 refer to streams of liquid indicated by full lines, and reference numerals 16–19 refer to streams of vapors, indicated by broken lines.

Reference numerals 1 and 3 indicate the lower and upper portion of the alcohol introducing column, numerals 2 and 4 the upper and the lower portion of the alcohol expelling column, 5 and 6 blowing devices, 7 and 8 evaporators, 9 the precipitator or stirring vessel in which the aluminum hydrate is precipitated. Pumps and valves have been omitted from the diagram. Columns 1 and 3 on the one hand, and columns 2 and 4 on the other hand, may be replaced, respectively, by a single alcohol introducing column and a single alcohol expelling column and may also have uniform operative cross sectional areas, however, the arrangement as illustrated in FIG. 1 with respect to the dividing of the alcohol producing and alcohol expelling columns, respectively, into two separate columns of different operative cross sectional area is preferred.

The aluminate liquor 10 from which the red mud has been separated is introduced at the upper end portion of column 3 and flows downwardly through the same with increasing methanol content and decreasing water content. After further increasing the methanol content of the liquor in column 1, liquid methanol 15 which contains about 20% water is admixed to the liquor 14 leaving column 1, and the thus methanol enriched liquor flows then to precipitator or stirring vessel 9. After precipitation of the aluminum hydrate in vessel 9, the residual liquor is pumped into column 2 in which the major portion of the methanol is withdrawn or expelled from the liquor. The residual methanol is expelled in column 4 so that liquor 12 which leaves column 4, contains only traces of methanol, for instance, of the magnitude of 0.0001 percent. Liquor 12 is then introduced into the evaporator. As illustrated in FIG. 1, the evaporator may be combined with the rectification device. Column 4 may be heated with the vapors formed by evaporation of the liquor in evaporator 7. It is also possible to heat evaporator 7 with steam from some other source or with vapors formed in another evaporator. Another portion of liquor 12 may be passed into vacuum evaporator 8 which is heated with a portion of the methanol vapors 16. Concentrated liquor 13 leaves evaporators 7 and 8. Evaporator 8 may be omitted and replaced, for instance, with a water-cooled condenser. It is also possible to heat column 4 with compressed vapors 16.

The major portion of vapors 16 are passed into column 1. The vapors 17 leaving column 1 may contain, for instance, 40% methanol. The major portion of these vapors is passed into column 2 and a minor portion into column 3, from the top of which steam 19 with very low methanol content may be withdrawn. Steam 19 is introduced into the lower portion of column 4.

Column 3 may be omitted, the liquor 10 fed directly into column 1 and the total amount of vapors 17 fed into column 2. In this case the process is less complicated, but also thermodynamically somewhat less advantageous. The equilibrium diagram FIG. 2 corresponds to this simplified scheme. According to FIG. 2 the vapors 17 contain approximately 50 mol percent methanol $$(y_T = 50)$$

vapors 16 contain 75 mol percent methanol ($y_B = 75$); liquor 10 contains no methanol ($x_T = 0$) and liquor 14 contains about 21 mol percent methanol ($x_B = 21$); liquor 11 about 31 mol percent methanol.

Due to the progressive increase in the methanol concentration in column 3, and particularly in column 1, aluminum hydrate tends to precipitate from the aluminate liquor passing through these columns. The liquor remains in column 3 and column 1 only for a short period of time. However, due to the precipitation of even relatively small quantities of aluminum hydrate, the undisturbed operation of the columns is impeded. This difficulty can be eliminated by designing column 1 as a spray column. However, it is preferred to periodically clean the columns by exchanging the functions of the alcohol introducing and the alcohol expelling columns, particularly of columns 1 and 2. In this manner, liquor 11 which contains only little aluminum oxide will dissolve the incrustations which were precipitated from liquor 10. Blowers 5 and 6 work alternatingly so that in the alcohol introducing column a somewhat higher pressure will be maintained at all times than in the alcohol expelling column whereby the flow of water vapors 18 in the desired direction will be assured. Apart from controlling the flow of water vapors 18, one of the blowers 5 or 6 will suffice.

The columns may be operated at approximately atmospheric pressure or also, at elevated pressures, for instance between 0 and 50 p.s.i.g. In the latter case, the operative cross section of the columns will be reduced. The flowsheet of FIG. 1 applies for operation at atmospheric as well as at elevated pressure; however, when operating at elevated pressure, the temperature of the liquod 14 leaving column 1, and the condensation temperature of the vapor 16 leaving column 2, will be higher, namely between 80 and 120° C. and 72 and 105° C., respectively. No advantage is found in operating the columns under a partial vacuum.

It is possible to add an enriching column to the alcohol expelling column; however, this does not give any thermodynamic advantages and requires a more complicated arrangement. It also will increase the consumption of heat and of cooling water.

Various types of columns may be used, including bubble cup plate and spray columns; however, preferably, columns with little pressure loss will be employed.

Due to the strong super-saturation of the liquor, the seeding of the liquor and precipitation of the aluminum hydrate under stirring may start already at about 75° C. and may be continued until the liquor in the precipitators has been step-wise cooled to about 55° C. Thereby a portion of the precipitated aluminum hydrate will be of relatively coarse granular size and, furthermore, the withdrawal of the heat of crystallization and the cooling of the liquor is facilitated. Furthermore, it is possible to start with the precipitation and the stirring at lower alcohol concentrations and to increase alcohol concentration and to continue precipitation under stirring after a portion of the aluminum hydrate already has been precipitated.

Thus, for instance, the liquor may at first contain only 2.5 pounds alcohol per pound of $Na_2O$, and at this alcohol content between 30 and 50% of the alumina content of the liquor will be precipitated. The alcohol content of the liquor is then increased to 4 pounds alcohol per pound of $Na_2O$ and precipitation is continued until a total of about 70 to 80% of the alumina content of the liquor has been precipitated as aluminum hydrate. The concentration of the liquor, expressed on an alcohol free basis, preferably will be between 150 and 200 grams of $Na_2O$/liter, and at the beginning of the precipitation between 150 and 220 grams of $Al_2O_3$/liter.

Since the boiling point of the alcohol-containing liquor is at about 80° C., the temperature of the liquor in the precipitators will be relatively close to the boiling point thereof. The liquor is cooled, preferably by being expanded into a moderate vacuum such as a residual pressure of between 0.9 and 0.3 atmosphere, or 13 to 4 p.s.i.a. from a temperature not exceeding 95° C., and preferably from a temperature between 70 and 85° C. to a lower temperature of preferably between 45 and 60° C.

The concentration of the liquor is 130–230 grams $Na_2O$/liter, preferably 150–200 grams $Na_2O$/liter and between 140–220 grams $Al_2O_3$/liter, expressed on an alcohol-free basis.

The vapor which emanates from the thus expanded or vacuum treated liquor is used either for heating of the liquor from which aluminum hydrate has been separated, for instance by filtration or it is passed to the alcohol expelling column or these vapors are condensed by means of cooling water. The vessels which serve for expanding the liquor or for subjecting the same to a partial vacuum may be arranged at such height above the precipitator that the liquor, after vapors have been separated therefrom, will flow back into the precipitator without requiring pumping. This arrangement may serve simultaneously for stirring of the liquor, i.e., for maintenance of the seed crystal suspension in the precipitator, by passing the liquor through a riser from the lowermost portion of the precipitator to the expansion vessel which is maintained at lower pressure. The formation of vapor bubbles in the riser will force circulation of the liquor which may be supported by blowing alcohol vapors into the riser.

It is a particularly important advantage of the method of the present invention that considerable savings of cooling water and steam are achieved thereby which, in comparison with a one step distillation for the recovery of methanol from the liquor, may amount to between 60 and 80% or even more than 80%. Savings in a similar ratio are also achieved with respect to the dimensions of the heating surfaces which are required. These savings will more than make up for the additional costs involved in providing the alcohol introducing column. A further advantage is found in the lowering of the temperature of the liquor in the alcohol introducing column caused by the increasing alcohol content of the same.

The following example is given as illustrative only without limiting the invention to the specific details thereof.

Example

For producing 1,000 kg. of $Al_2O_3$, an amount of 8.6 m.³ of clarified liquor, i.e., liquor from which the red mud has been removed, will be required. This amount of clarified liquor contains 1,290 kg. $Na_2O$ and 1,373 kg. $Al_2O_3$. The liquor is fed either into column 3, as shown in FIG. 1, or, if column 3 is omitted, directly into column 1. In the column, 2,340 kg. of alcohol, methanol or ethanol, are incorporated in the liquor and at the same time the liquor will lose 1,320 kg. water. Into the thus treated liquor, indicated by reference numeral 14, is introduced, the condensate 15 containing 1,840 kg. alcohol and 350 kg. water. Thereafter, 3,000 kg. hydrate seed crystals are added. The liquor passes through a series of precipitators while being gradually cooled from 75° C. to 55° C. Altogether, 75% of the total alumina content of the liquor are precipitated as aluminum hydrate. After separation of the precipitated hydrate by filtration or sedimentation, the residual liquor is fed into the stripping or alcohol expelling column 2 and passed from there through column 4. The liquor leaving column 4 contains only traces of alcohol. It has a volume of about 7.6 m.³ and a total $Na_2O$ content of about 1,270 kg.

The portion of the alcohol which adheres to the filtered hydrate is stripped by treatment with water vapors and the hydrate then washed in conventional manner.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are in-

What is claimed as new and desired to be secured by Letters Patent is:

1. A method of producing alumina, comprising the steps of contacting aluminate liquor with a mixture of water vapors and vapors of an alcohol selected from the group consisting of methanol and ethanol, so as to simultaneously dissolve said alcohol in said aluminate liquor and evaporate a portion of the water content thereof; seeding the thus formed alcohol-containing aluminate liquor with aluminum hydrate crystals thereby causing precipitation of aluminum hydrate from said aluminate liquor; and separating solid aluminum hydrate from the thus formed mixture.

2. A method as defined in claim 1, wherein said contacting of aluminate liquor with said vapor mixture is carried out in an alcohol introducing column, and including the step of introducing an additional amount of said alcohol in liquid form into the alcohol-containing aluminate liquor.

3. A method of producing alumina, comprising the steps of contacting aluminate liquor in an alcohol introducing column with a mixture of water vapors and vapors of an alcohol selected from the group consisting of methanol and ethanol so as to simultaneously dissolve said alcohol in said aluminate liquor and evaporate a portion of the water content thereof; seeding the thus formed alcohol-containing aluminate liquor with aluminum hydrate crystals thereby causing precipitation of aluminum hydrate from said aluminum liquor; separating solid aluminum hydrate from the thus formed mixture; and passing the thus obtained residual liquor through an alcohol expelling column so as to withdraw alcohol vapors therefrom.

4. A method as defined in claim 3, and including the steps of introducing an additional amount of said alcohol in liquid form into the alcohol-containing, aluminate liquor prior to or during seeding of the latter.

5. A method of producing alumina, comprising the steps of contacting aluminate liquor in an alcohol introducing column with a mixture of water vapors and vapors of an alcohol selected from the group consisting of methanol and ethanol so as to simultaneously dissolve said alcohol in said aluminate liquor and evaporate a portion of the water content thereof; withdrawing a vapor mixture enriched in water vapors from said alcohol introducing column; seeding the thus formed alcohol-containing aluminate liquor with aluminum hydrate crystals thereby causing precipitation of aluminum hydrate from said aluminum liquor; separating solid aluminum hydrate from the thus formed mixture; and passing the thus obtained residual liquor through a steam-operated alcohol expelling column so as to withdraw alcohol vapors therefrom.

6. A method as defined in claim 5, wherein at least a portion of the vapor mixture withdrawn from said alcohol introducing column is introduced into said alcohol expelling column and at least a portion of the mixture of alcohol and water vapors formed in said alcohol expelling column is introduced into said alcohol introducing column.

7. A method as defined in claim 6, wherein said portion of the vapor mixture is introduced into the lower portion of said alcohol expelling column.

8. A method of producing alumina, comprising the steps of contacting aluminate liquor in a first column with a mixture of water vapors and vapors of an alcohol selected from the group consisting of methanol and ethanol so as to simultaneously dissolve said alcohol in said aluminate liquor and evaporate a portion of the water content thereof; seeding the thus formed alcohol-containing aluminate liquor with aluminum hydrate crystals thereby causing precipitation of aluminum hydrate from said aluminate liquor whereby a portion of said aluminum hydrate will form deposits in said first column; separating solid aluminum hydrate from the thus formed reaction mixture, thereby obtaining a residual alcohol-containing aluminate liquor; passing said residual liquor through a second column so as to withdraw alcohol vapors therefrom; and reversing the sequence of flow of said liquor through said columns when a predetermined amount of aluminum hydrate deposit has been formed in said first column.

References Cited

UNITED STATES PATENTS 2,382,044    8/1945    Fisher _____ 203—19

FOREIGN PATENTS 628,234    9/1961    Canada.

OTHER REFERENCES

Chemical Engineers' Handbook, Perry, Ed., 3rd ed., McGraw-Hill Book Co., 1950, p. 631. TP 155 P4.

OSCAR R. VERTIZ, *Primary Examiner.*

GEORGE T. OZAKI, *Assistant Examiner.*